United States Patent
Nagle et al.

(10) Patent No.: US 6,349,611 B1
(45) Date of Patent: Feb. 26, 2002

(54) CABLE OPERATED ACTUATOR ASSEMBLY

(75) Inventors: John M. Nagle, Royal Oak; David A. Van Zanten, Troy; Michael J. Konn, Utica, all of MI (US)

(73) Assignee: L & P Property Management Company, South Gate, CA (US)

(*) Notice: Subject to any disclaimer, the term of this patent is extended or adjusted under 35 U.S.C. 154(b) by 0 days.

(21) Appl. No.: 09/528,651

(22) Filed: Mar. 20, 2000

(51) Int. Cl.$^7$ ................................................. B62D 1/18

(52) U.S. Cl. ...................... 74/493; 74/502.4; 74/502.6

(58) Field of Search ............................ 74/493, 502.4, 74/502.6; 280/775

(56) References Cited

U.S. PATENT DOCUMENTS

| | | | |
|---|---|---|---|
| 1,671,396 A | * 5/1928 | Ballentine et al. | 74/502.6 X |
| 2,975,653 A | 3/1961 | Morse | 74/501 |
| 3,101,821 A | 8/1963 | Henry | 192/0.096 |
| 3,206,998 A | 9/1965 | Matz, Jr. et al. | 74/494 |
| 3,208,300 A | 9/1965 | Morse | 74/498 |
| 3,245,282 A | 4/1966 | Kimberlin | 74/493 |
| 3,279,277 A | 10/1966 | Stevens et al. | 74/493 |
| 3,678,778 A | 7/1972 | Groves | 74/493 |
| 3,691,866 A | * 9/1972 | Berkes | 74/493 |
| 3,762,491 A | 10/1973 | Meyer | 180/79.1 |
| 3,991,633 A | 11/1976 | Molnar et al. | 74/493 |
| 4,225,148 A | 9/1980 | Andersson | 280/95 R |
| 4,380,178 A | 4/1983 | Bennett et al. | 74/501 P |
| 4,449,420 A | 5/1984 | Baba | 74/501 R |
| 4,453,428 A | 6/1984 | Kobelt | 74/501 R |
| 4,474,085 A | 10/1984 | DeVogelaere et al. | 74/878 |
| 4,507,982 A | 4/1985 | Turner et al. | 74/493 |
| 4,599,500 A | 7/1986 | Wilcox | 200/61.54 |
| 4,674,769 A | 6/1987 | Ota et al. | 280/775 |
| 4,735,165 A | 4/1988 | Baba et al. | 114/144 |
| 4,752,085 A | 6/1988 | Yamamoto | 280/775 |
| 4,753,121 A | 6/1988 | Venable et al. | 74/493 |
| 4,833,936 A | 5/1989 | Mariani et al. | 74/493 |
| 5,090,730 A | 2/1992 | DuRocher et al. | 280/775 |
| 5,125,685 A | 6/1992 | Takahashi et al. | 280/775 |
| 5,168,768 A | 12/1992 | Easton | 74/493 |
| 5,209,512 A | 5/1993 | Hancock et al. | 280/775 |
| 5,211,042 A | 5/1993 | Watanuki | 70/252 |
| 5,226,853 A | 7/1993 | Courgeon | 464/160 |
| 5,269,562 A | 12/1993 | Peitsmeier et al. | 280/775 |
| 5,307,707 A | * 5/1994 | Roelle | 74/502.6 |
| 5,363,716 A | 11/1994 | Budzik, Jr. et al. | 74/493 |
| 5,393,094 A | 2/1995 | Wardavoir | 280/775 |
| 5,490,434 A | 2/1996 | Osborn et al. | 74/475 |
| 5,503,431 A | 4/1996 | Yamamoto | 280/777 |
| 5,520,416 A | 5/1996 | Singer, III et al. | 280/775 |
| 5,624,334 A | * 4/1997 | Lumpkin | 474/79 |

(List continued on next page.)

FOREIGN PATENT DOCUMENTS

| | | | |
|---|---|---|---|
| FR | 991087 | * 10/1951 | 74/502.6 |
| GB | 10170 | * of 1909 | 74/502.6 |
| IT | 406602 | * 3/1947 | 74/502.4 |

Primary Examiner—Allan D. Herrmann
(74) Attorney, Agent, or Firm—Thompson Coburn LLP; Grant D. Kang

(57) ABSTRACT

The inventive cable operated actuator assembly includes an actuator element, a reaction element, a conduit defining a lumen therethrough, a cable longer than the conduit slideably disposed through the lumen of the conduit, and at least one pivoting ferrule defining a bore therethrough. One of the ends of the conduit is secured to the actuator element and the other end of the conduit is secured to the pivoting ferrule. The reaction element is pivotally secured to the other end of the pivoting ferrule. While the cable is slideably disposed within the bore, the second end of the cable extends out of the second end of the pivoting ferrule. At least one of the pivoting ferrule and the reaction element may pivot substantially about the axis created by the cable as it exits the second end of the pivoting ferrule. A specific application of the inventive assembly includes a steering column tilt actuator assembly.

41 Claims, 8 Drawing Sheets

U.S. PATENT DOCUMENTS

| | | | |
|---|---|---|---|
| 5,626,059 A | 5/1997 | Bobbitt, III et al. | 74/493 |
| 5,655,415 A | 8/1997 | Nagle et al. | 74/502.6 |
| 5,732,600 A | 3/1998 | Peterson et al. | 74/492 |
| 5,735,631 A | 4/1998 | Patzelt et al. | 403/378 |
| 5,744,769 A | 4/1998 | Proctor et al. | 200/61.54 |
| 5,769,453 A | 6/1998 | Peitsmeier et al. | 280/775 |
| 5,820,163 A | 10/1998 | Thacker et al. | 280/775 |
| 5,829,311 A | 11/1998 | Roberson | 74/493 |
| 5,857,932 A * | 1/1999 | Sugimoto | 474/82 |
| 5,890,397 A | 4/1999 | Stoner et al. | 74/493 |
| 5,911,789 A | 6/1999 | Keipert et al. | 74/493 |

* cited by examiner

CABLE OPERATED ACTUATOR ASSEMBLY

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

The present invention relates to cable operated actuator devices having at least one dynamic element. More specifically, the invention relates to steering column tilt actuator assemblies for automotive vehicles.

BRIEF DISCLOSURE OF THE INVENTION

The inventive cable operated actuator assembly including an actuator element, a reaction element, a conduit defining a lumen therethrough, a cable longer than the conduit slideably disposed through the lumen of the conduit, and at least one pivoting ferrule defining a bore therethrough. One of the ends of the conduit is secured to the actuator element and the other end of the conduit is secured to the pivoting ferrule. The reaction element is pivotally secured to the other end of the pivoting ferrule. While the cable is slideably disposed within the bore, the second end of the cable extends out of the second end of the pivoting ferrule. At least one of the pivoting ferrule and the reaction element may pivot substantially about the axis created by the cable as it exits the second end of the pivoting ferrule.

A specific application of the inventive assembly includes a steering column tilt actuator assembly including an actuator element, a reaction element, a conduit defining a lumen therethrough, a cable longer than the conduit and being slideably disposed through the lumen of said conduit, and a pivoting ferrule defining a bore therethrough. One end of the conduit is secured to the reaction element and the other end of the conduit is secured to the pivoting ferrule. The reaction element is pivotally secured to the pivoting ferrule while the cable is slideably disposed within the bore with the cable extending out of the second end of the pivoting ferrule. At least one of said pivoting ferrule and the reaction fitting may pivot substantially about the axis created by said cable as it exits the pivoting ferrule.

BRIEF DESCRIPTION OF THE DRAWINGS

Similar reference characters in the various figures refer to similar elements of the drawings.

DETAILED DESCRIPTION OF THE INVENTION AND MODE(S) FOR CARRYING OUT THE INVENTION

Figure 1:
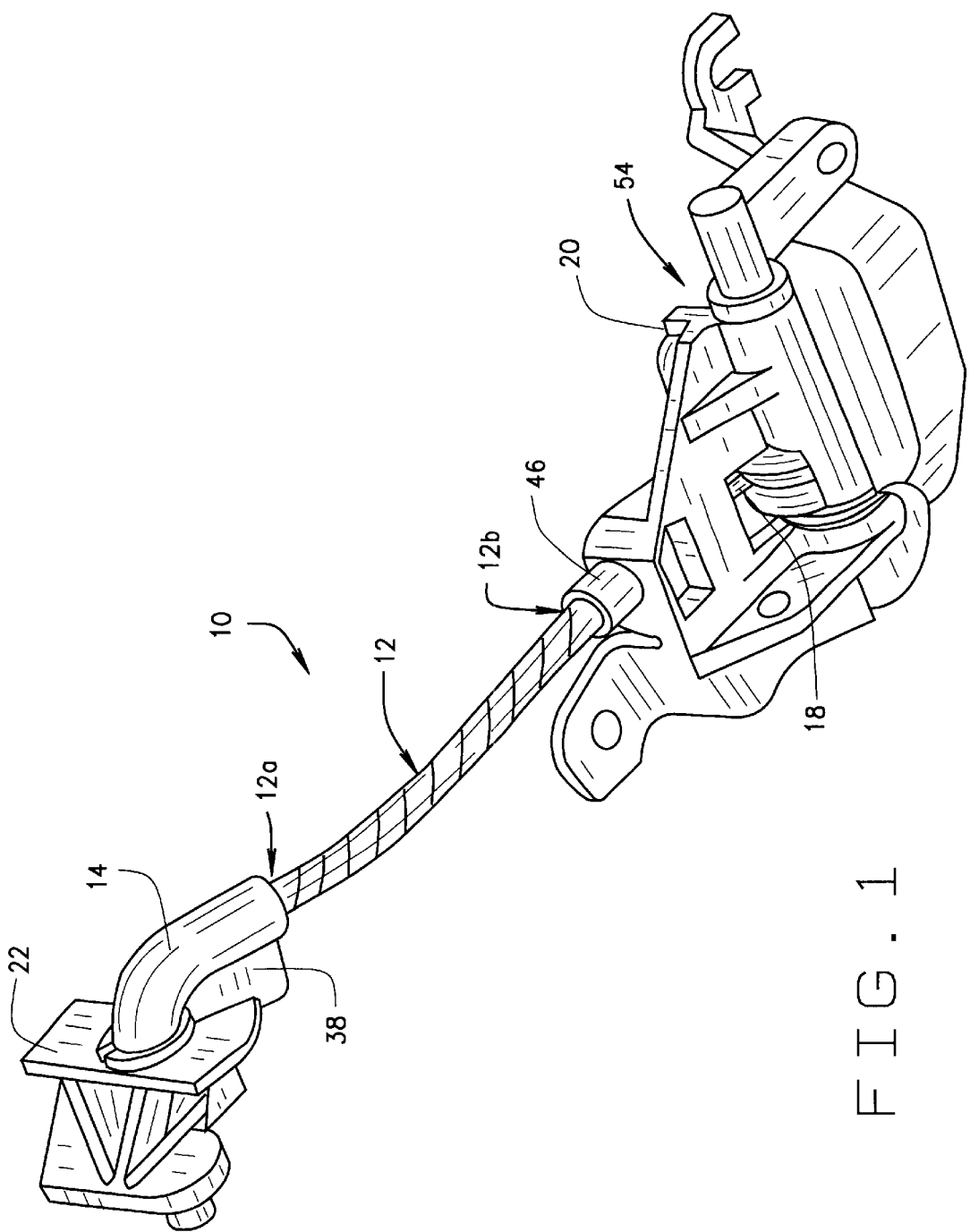
FIG. 1 is an overall view of the assembly.
Figure 2:
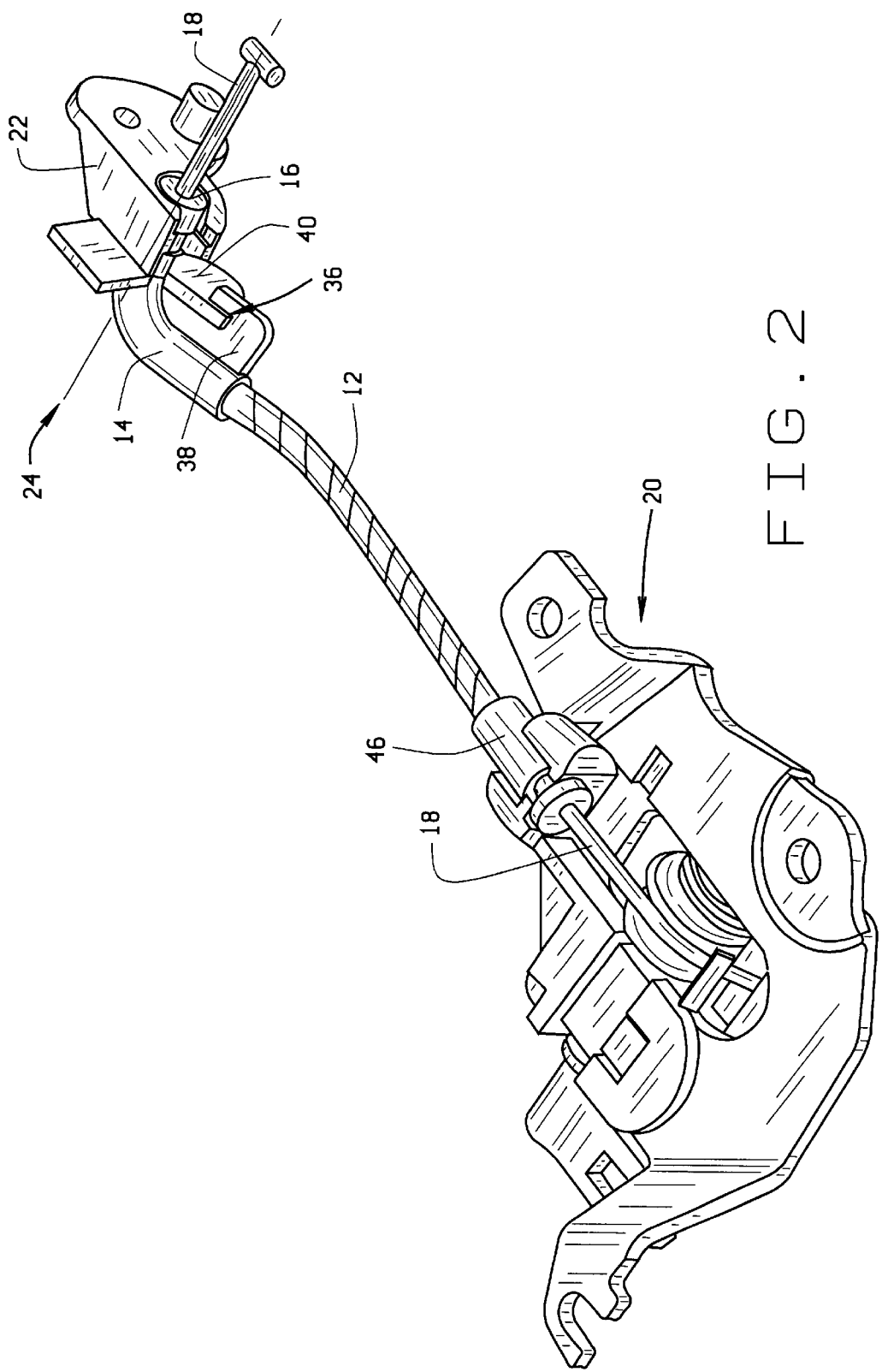
FIG. 2 is an overall view of the assembly showing the opposite side as that shown in FIG. 1.

Turning to FIG. 1, we see that the inventive apparatus, generally 10, includes a conduit 12 with two ends, 12a and 12b. Not visible is an axial hole or lumen extending though the conduit 12 and exiting at the ends 12a and 12b of the conduit 12. Attached to at least one end 12a or 12b of the conduit 12 is at least one pivoting ferrule 14 having a bore 16 therethrough. As shown in FIG. 2, a cable 18 extends through and is slideably disposed within the lumen in the conduit 12 as well as the bore 16 within the pivoting ferrule 14. As length of the cable 18 is longer than the length of the conduit 12, the cable 18 extends out both ends 12a and 12b of the conduit 12.

Figure 6:
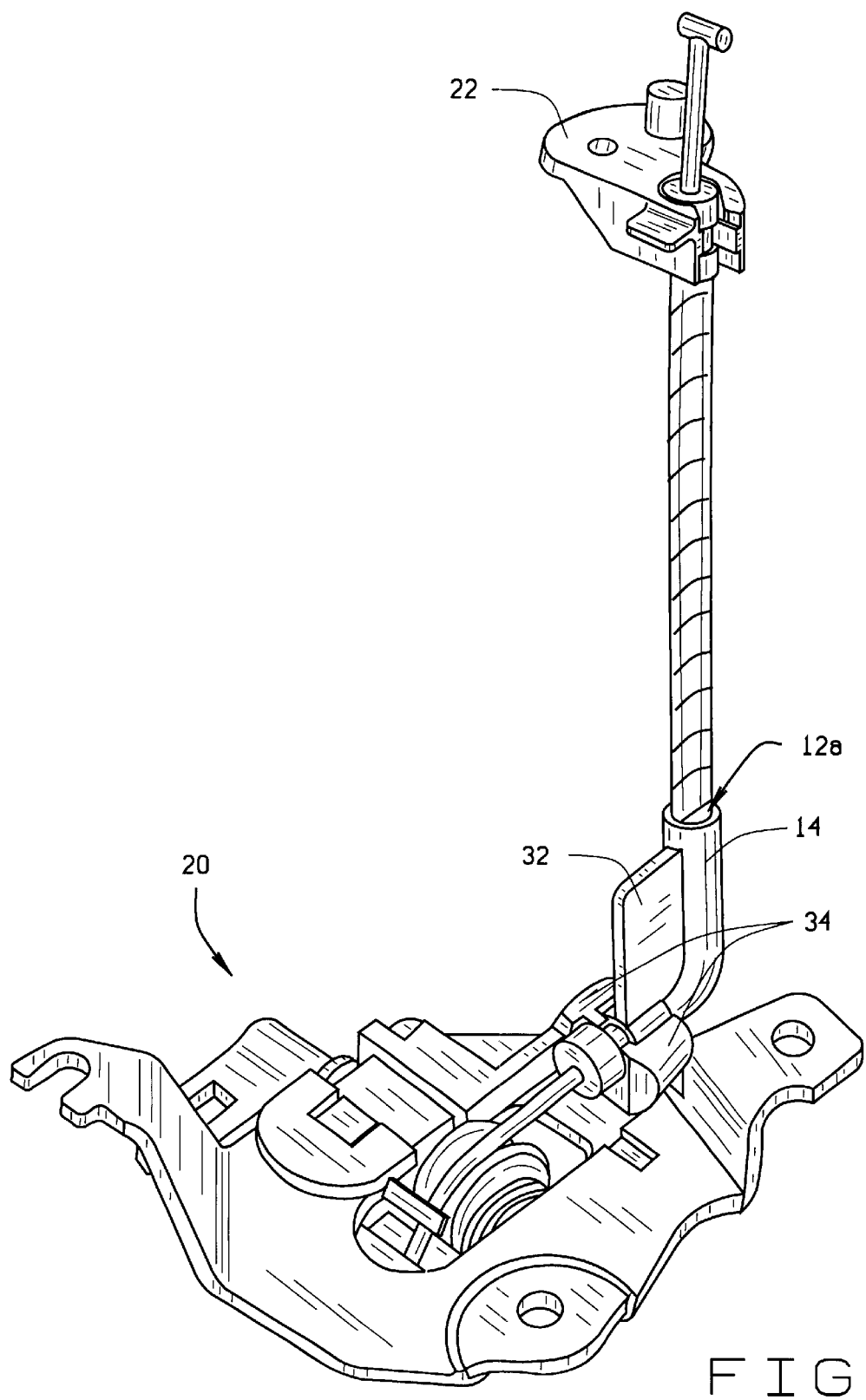
FIG. 6 is an overall view of another embodiment of the assembly.
Figure 7:
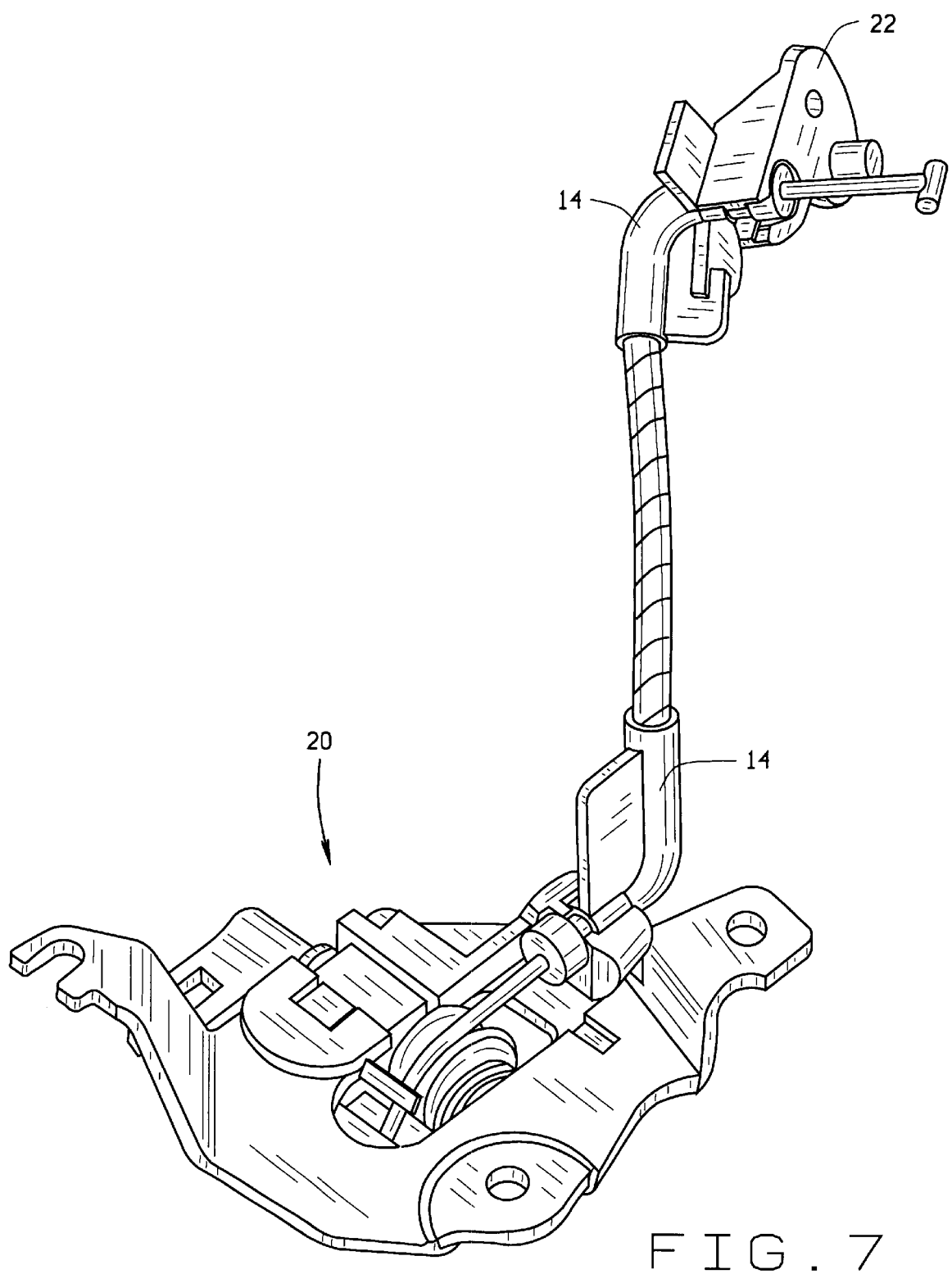
FIG. 7 is an overall view of another embodiment of the assembly showing two pivoting ferrules.

The conduit 12 is operatively attached at one end 12a to a reaction element, generally 22 and at the other end 12b to an actuator element 20. As shown in FIGS. 1 through 5, the pivoting ferrule 14 may be used to pivotally secure one end of the conduit (shown as 12a, but may be 12a or 12b) to the reaction element 22. Alternatively, as shown in FIG. 6, the pivoting ferrule 14 may pivotally secure the conduit end 12a to the actuator element 20. Another alternative is shown in FIG. 7, in which two pivoting ferrules 14 are used to pivotally secure the ends 12a and 12b of the conduit 12 to elements 22 and 20.

The cable 18 is slideably disposed within the lumen of the conduit 12 and the bore 16 of the pivoting ferrule 14. One end of the cable 18 is also in operative contact with the actuator element 20 and the other end with the reaction element 22. This allows the cable 18 to be moved by the user through operation of the actuator element 20. Operation of the actuator element 20 transfers the movement of the cable to the reaction element 22 where the desired operation is effected.

Figure 4:
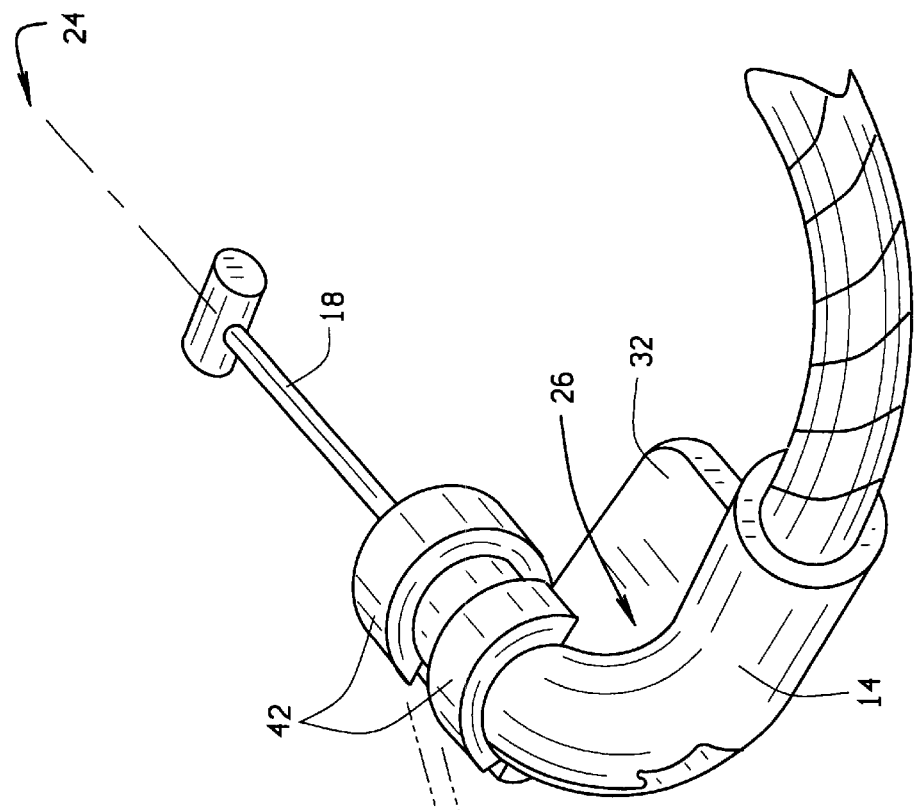
FIG. 4 is a close up-view of an embodiment of the pivoting ferrule.
Figure 4:
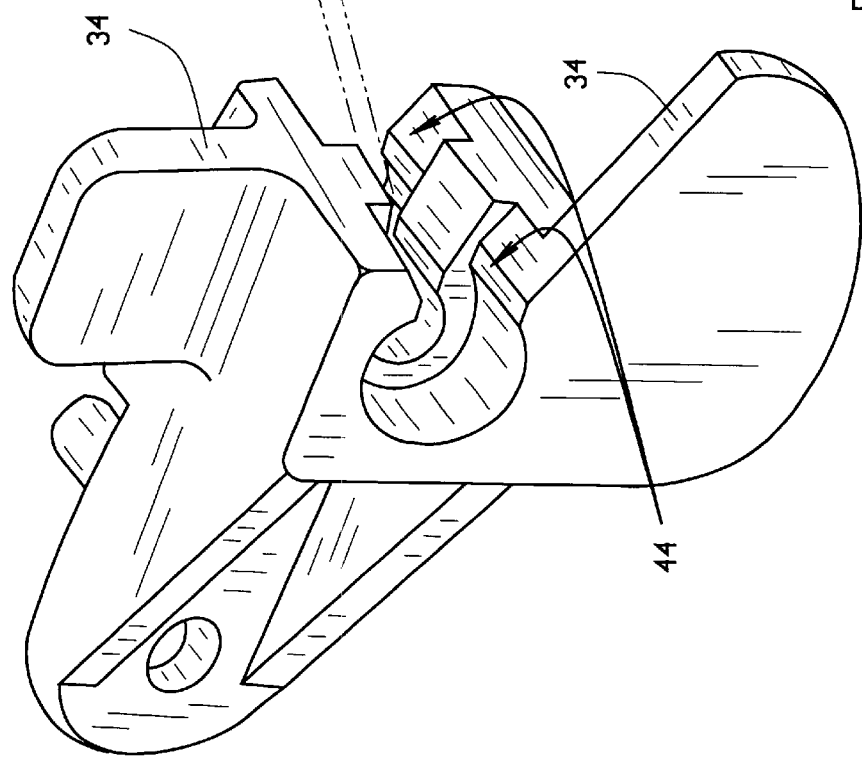

The pivoting ferrule 14 is adapted to pivot substantially about the axis 24 shown in FIGS. 2 and 4, created by the cable 18 as it exits the end of the pivoting ferrule 14 not connected to the conduit 12. Alternatively, or in combination with the pivoting ferrule 14, the element 20 or 22 connected to the pivoting ferrule 14 may pivot about the same axis 24, if desired. This pivoting capability allows the assembly 10 to compensate for relative motion between the elements 20 and 22 while avoiding undue stress on the conduit 12 and the cable 18.

As shown in FIG. 4, an angle 26 may be incorporated into the pivoting ferrule 14 between its ends. By bending the ferrule 14, the cable 18 may be directed to provide the most efficient or effective arrangement of the apparatus 10 in a given application. Also, with an angle 26 in the pivoting ferrule 14, greater benefit may received from the pivoting characteristics of the apparatus 10.

Figure 3:
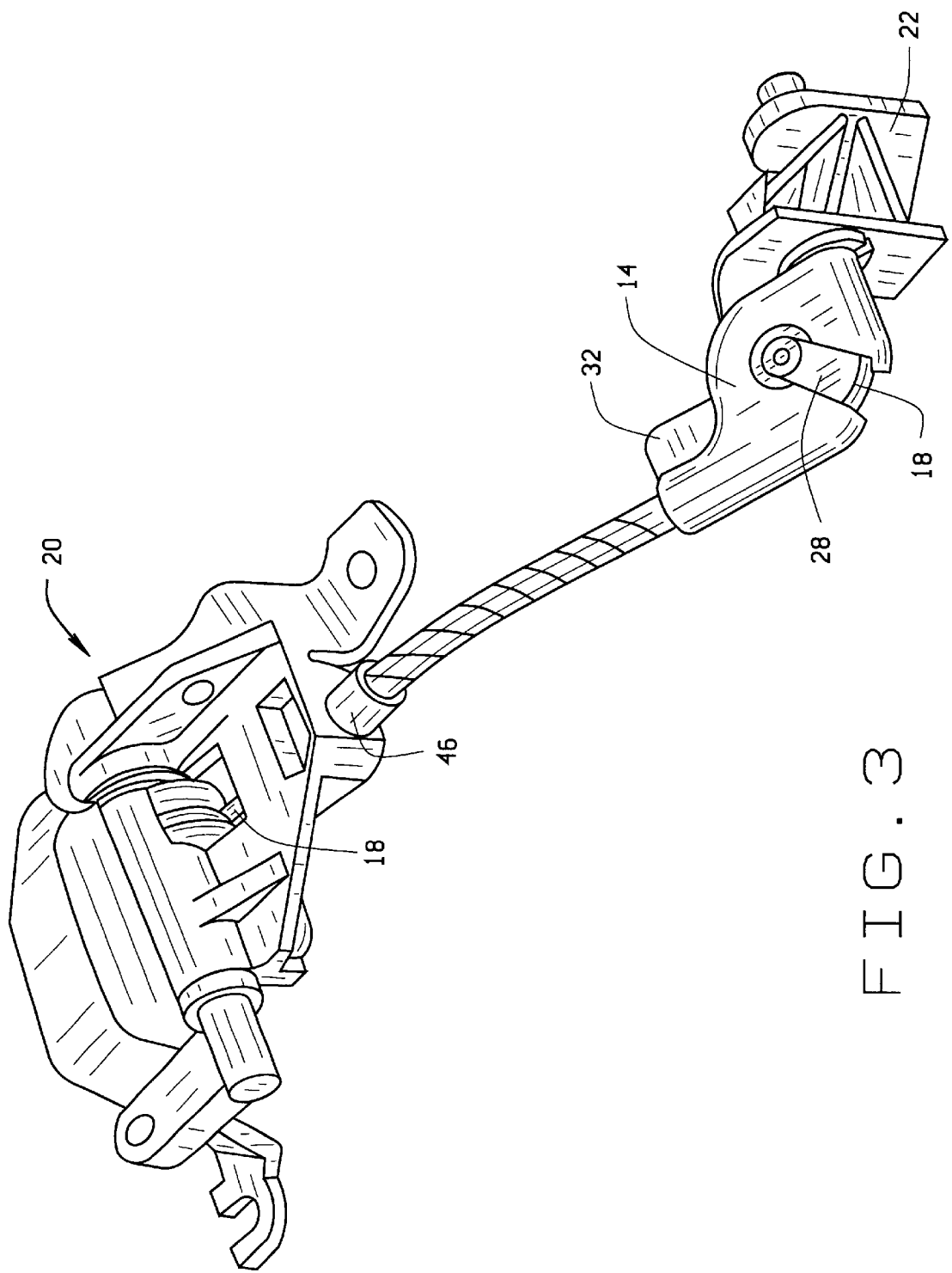
FIG. 3 is an overall view of another embodiment of the assembly showing an integral pulley.

The pivoting ferrule 14 may also include a pulley, one embodiment of which is shown in FIG. 3. The pulley 28 is used to ease the stress on the cable 18 and increase the efficiency of its movement as it traverses the angle 26 in the pivoting ferrule 14. And as shown in FIG. 3, the pulley may be integral to the ferrule 14 itself, although other arrangements are possible.

The apparatus 10 may also include a pivot limiting structure that limits the pivoting movement of the pivoting ferrule 14 and/or the element 20 or 22 it is connected to, to a predetermined portion of an arc. In FIG. 4, this structure is illustrated as a tab 32 on the pivoting ferrule 14 that contacts protrusions 34 on the reaction element 22 at the limits of the desired pivot arc. FIG. 6 illustrates a similar embodiment on the actuator element 20.

Alternatively or in combination with a pivot limiting structure, the apparatus 10 may also include a retention fixture. When utilized, this retention fixture substantially limits the motion of the pivoting ferrule 14 to pivoting about the axis 24 created by the cable 18 as it exits the second end of the pivoting ferrule 14. FIG. 2 shows one embodiment of the retention fixture as a slot 36 built into a protuberance 38 on the pivoting ferrule 14. The slot 36 engages and rides along a tab 40 shown on the reaction element 22 (but which may be on the actuating element 20, as appropriate) as the pivoting ferrule 14 pivots, thus limiting the motion of the pivoting ferrule 14 to pivoting about said axis 24.

FIG. 4 shows another embodiment of this retention fixture. In this embodiment, the pivoting ferrule 14 has a retention fixture comprising at least one protuberance 42 on the pivoting ferrule 14 and at least one concavity 44 in the element 20 or 22 pivotally secured to the pivoting ferrule 14. The concavity 44 is adapted to receive the corresponding protuberance 42 such that movement of the pivoting ferrule 14 is restricted to the desired axis 24. In FIG. 4, two circumferencial protuberances 42 and two corresponding concavities 44 are illustrated although various numbers and arrangement of such structures are possible to provide the desired function.

The actuator 20 and reaction 22 elements in the apparatus 10 each can be fittings, brackets or even complete multi-part mechanisms, as the application requires. For example, in FIG. 1, the reaction element 22 is a simple fitting. As such, in use, the reaction element 22 shown in FIG. 1 may be placed in operative connection to additional components resulting in the capability to perform some function in response to movement of the cable 18 by the actuator element 20. On the other hand, the actuator element 20 of FIG. 1, shown more clearly in FIG. 2, is illustrated as a multipart mechanism which acts on the cable 18.

Figure 5:
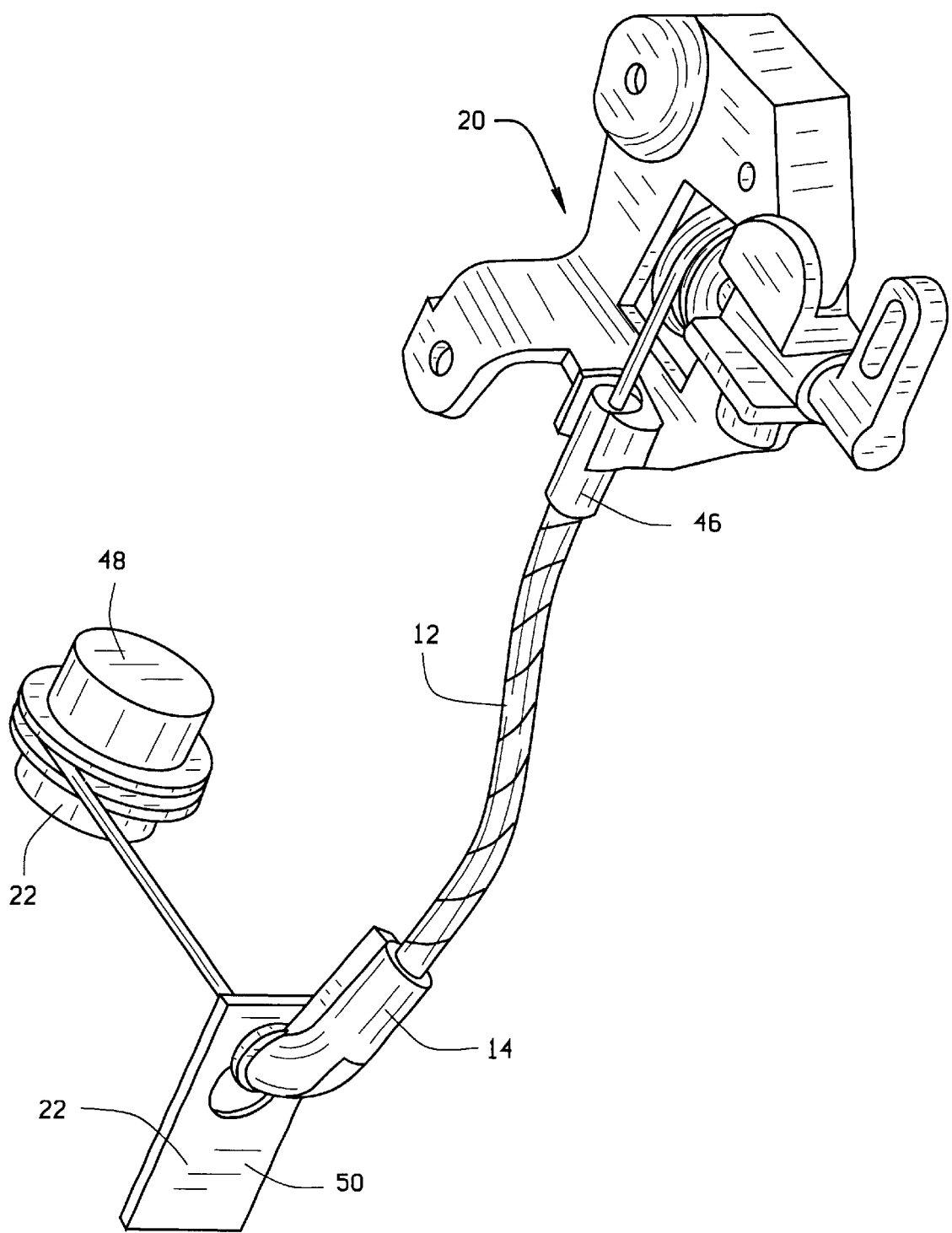
FIG. 5 is an overall view of another embodiment of the assembly.

FIG. 5 illustrates a multipiece reaction element comprising a mounting plate 50 for the pivoting ferrule 14 and an attachment lug 48 for the cable 18. In operation of this embodiment, the attachment lug 48 reacts to movement of the cable 18 to cause the desired reaction. Movement of the cable 18 is caused by activation of the actuator element 20 which pulls the cable 18 through the pivoting ferrule 14 and conduit 12, thereby activating the reaction element 22.

FIGS. 1, 2, 3 and 5 all show a standard ferrule 46 on the end 12a or 12b of the conduit 12 opposite the pivoting ferrule 14. Another embodiment of the invention may include pivoting ferrules 14 at both ends of the conduit 12 so as to allow for greater compensation of relative movement at the ends of the conduit 12 as well as other benefits. Such an arrangement is illustrated in FIG. 7. Note that if two pivoting ferrules 14 are used, they may be configured to pivot about parallel or non-parallel axes, in either the same or different planes, as desired. As illustrated in FIG. 7, the pivoting ferrules 14 are oriented to pivot about substantially perpendicular axes. Such an arrangement may help alleviate stress on the conduit 12 and allow more free relative movement of the elements 20 and 22 in multiple directions.

The conduit 12 can be of any appropriate material or structure. It may be flexible or rigid as the application desires since the pivoting ferrule 14 at least helps compensate for relative movement between the elements 20 and 22 so that these loads are not born solely by the flexing of the conduit 12. And although at least one embodiment of the invention (the steering wheel tilt lock assembly) may employ a conduit 12 of relatively short length (approximately 80 mm) to maximize the pivoting characteristics of the assembly, the conduit 12 can be of any suitable length shorter or longer than the length of the cable 18.

Also, the cable 18 disposed in the conduit 12 can be of any suitable construction and material with the flexibility and resistance to elongation and/or compression necessary for the desired function. For example, for corrosion resistance, the cable 18 could be made of a plastic or other composite material. For added flexibility, it could be construction of multiple strands of fiber or metal.

Figure 8:
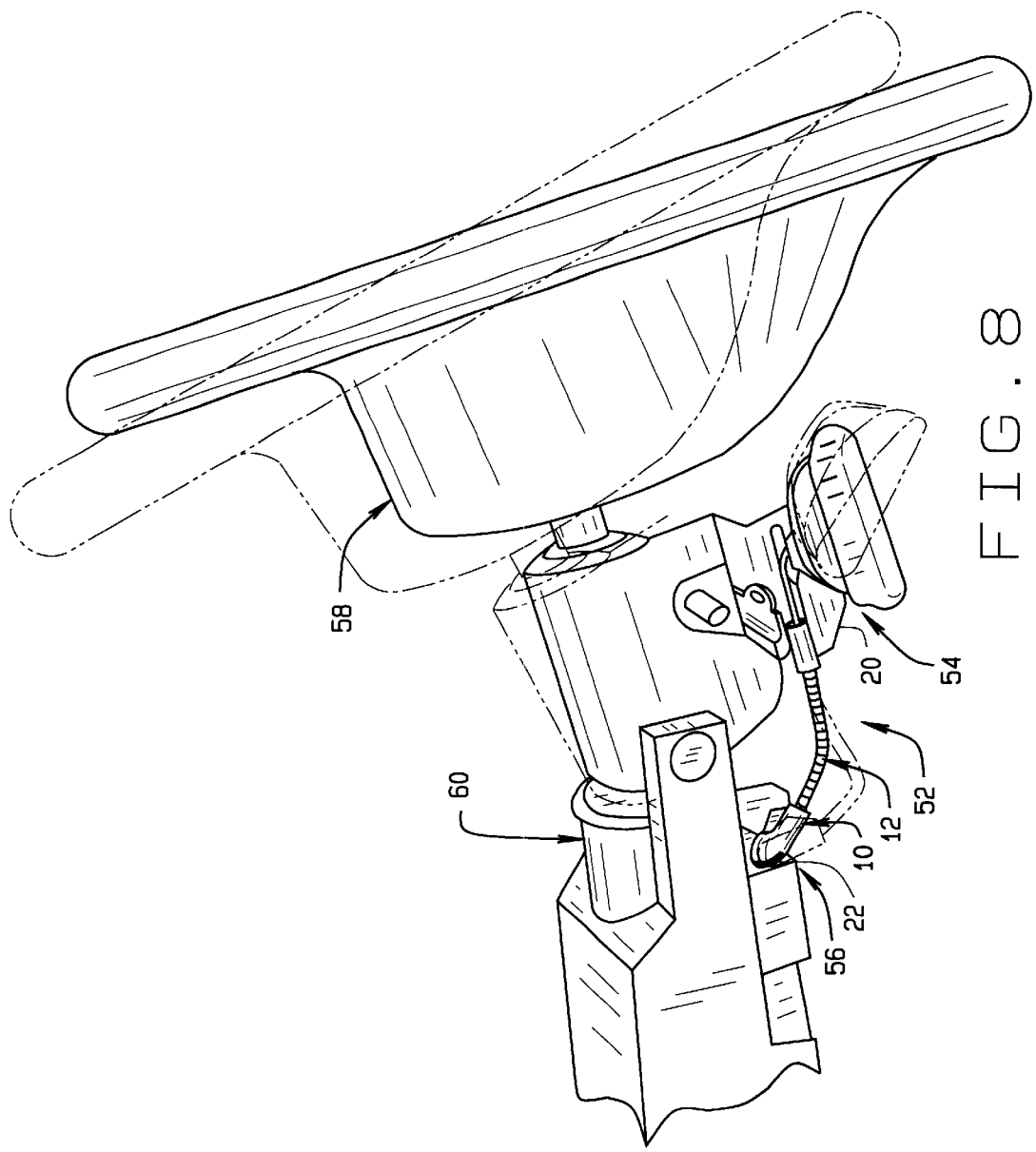
FIG. 8 is an exemplary view of a steering wheel tilt lock assembly.

One application for the inventive assembly 10 is in a steering wheel tilt lock assembly 52, as illustrated in FIG. 8, although many applications are possible outside of steering column tilt assemblies. In such a use, the actuator element 20 comprises or is operatively connected to a tilt-lock release mechanism 54, as also illustrated in FIG. 1. The reaction element 22 comprises or is operatively connected to a steering wheel tilt lock 56, as also illustrated in FIG. 1. Activation of the actuator element 20 causes movement of the cable 18 within the conduit 12 which pulls on and activates the reaction element 22, releasing the steering wheel tilt lock 56. When released, the steering wheel 58 of the vehicle is free to tilt causing relative movement between the actuator 20 and reaction 22 elements. This relative movement is compensated for by the pivotal mounting of the pivoting ferrule 14 to the reaction mechanism 22. In such an arrangement, the actuator element 20, connected to the tilting part of the steering wheel 58, is the dynamic or moving element, while the reaction element 22 is fixed since it is secured to a normally non-moving section of the steering column 60.

Obviously, different applications or designs of steering column tilt systems could have the reaction element 22 as the dynamic element, or even have both elements be dynamic. As disclosed above, the pivoting ferrule 14 may be connected to either or both of the reaction 22 or actuator elements 20 and, similarly, may be connected to either or both of the dynamic or fixed elements.

Only certain embodiments of the present invention have been disclosed herein. Numerous modifications and alterations of the present invention may be possible without departing from the spirit and scope of the invention. Thus, this disclosure shall not be read as limiting the scope of the invention as claimed.

We claim:

1. A actuator assembly comprising:
   an actuator element;
   a reaction element having a relative motion with said actuator element;
   a conduit having first and second ends, a first predetermined length, and defining a lumen therethrough;
   a cable having first and second ends and a second predetermined length longer than the first predetermined length and being slideably disposed through said lumen of said conduit; and
   a pivoting ferrule having first and second ends and defining a bore therethrough;
   wherein one of said first and second ends Of said conduit is secured to said actuator element;
   wherein the other of said first and second ends of said conduit is secured to the first end of said pivoting ferrule;
   wherein said reaction element is pivotally secured to the second end of said pivoting ferrule;
   wherein said cable is slideably disposed within said bore and the second end of said cable extends out of the second end of said pivoting ferrule;

wherein at least one of said pivoting ferrule and said reaction element pivots in response to said relative motion between said reaction element and said actuator element.

2. The actuator assembly of claim 1 wherein said pivoting ferrule has an angle therein between its first and second ends.

3. The actuator assembly of claim 1 wherein the first end of said conduit is secured to said actuator element by a second ferrule.

4. The actuator assembly of claim 1 wherein said reaction element has a first retention fixture, said pivoting ferrule has a second retention fixture and said first and second fixtures are in operative contact with each other substantially limiting movement of at least one of said pivoting ferrule and said reaction element to pivoting about the axis created by said cable as said cable exits the second end of said pivoting ferrule.

5. The actuator assembly of claim 1 further comprising a means for substantially limiting movement of at least one of said pivoting ferrule and said reaction element to pivoting about the axis created by said cable as said cable exits the second end of said pivoting ferrule.

6. The actuator assembly of claim 1 wherein said reaction element has a fixed position and said actuator element has relative movement with said reaction element.

7. The actuator assembly of claim 1 further comprising a second pivoting ferrule disposed on the opposite end of said conduit from said first pivoting ferrule and pivotally securing that opposite end of said conduit to said actuator element.

8. The actuator assembly of claim 1 further comprising a pivot limiting structure.

9. The actuator assembly of claim 1 further comprising a means for limiting the pivoting movement of at least one of said pivoting ferrule and reaction element to pivoting in a portion of an arc about the axis created by said cable as said cable exits the second end of said pivoting ferrule.

10. The actuator assembly of claim 2 wherein the angle in said pivoting ferrule is approximately ninety degrees.

11. The actuator assembly of claim 2 wherein said pivoting ferrule contains a pulley between its first and second ends over which said cable passes as it traverses the angle in said pivoting ferrule.

12. The actuator assembly of claim 11 wherein said pulley is integral with said pivoting ferrule.

13. The actuator assembly of claim 4 wherein said first retention fixture is a tab oriented substantially perpendicular to the pivot axis of the pivoting ferrule and said second retention fixture is a slot adapted to receive said tab.

14. The actuator assembly of claim 4 wherein said first retention fixture is at least one protuberance and said second retention fixture is at least one concavity adapted to receive said protuberance.

15. The actuator assembly of claim 7 wherein said first and second pivoting ferrules are configured to pivot in different planes.

16. The actuator assembly of claim 6 wherein the first end of said cable is in operative connection with said actuator element and said second end of said cable is in operative connection with said reaction element.

17. The actuator assembly of claim 16 wherein said reaction element is a steering wheel tilt lock.

18. The actuator assembly of claim 17 wherein said actuator element is a tilt-lock release mechanism.

19. An actuator assembly comprising:
an actuator element;
a reaction element having a relative motion with said actuator element;
a conduit having first and second ends, a first predetermined length, and defining a lumen therethrough;
a cable having first and second ends and a second predetermined length longer than the first predetermined length and being slideably disposed through said lumen of said conduit; and
a pivoting ferrule having first and second ends and defining a bore therethrough;
  wherein one of said first and second ends of said conduit is secured to said reaction element;
  wherein the other of said first and second ends of said conduit is secured to the first end of said pivoting ferrule;
  wherein said actuator element is pivotally secured to the second end of said pivoting ferrule;
  wherein said cable is slideably disposed within said bore and the second end of said cable extends out of the second end of said pivoting ferrule;
  wherein at least one of said pivoting ferrule and said actuator element pivots in response to said relative motion between said reaction element and said actuator element.

20. The actuator assembly of claim 19 wherein said pivoting ferrule has an angle therein between its first and second ends.

21. The actuator assembly of claim 19 wherein the first end of said conduit is secured to said reaction element by a second ferrule.

22. The actuator assembly of claim 19 wherein said actuator element has a first retention fixture, said pivoting ferrule has a second retention fixture and said first and second fixtures are in operative contact with each other substantially limiting movement of at least one of said pivoting ferrule and actuator element to pivoting about the axis created by said cable as said cable exits the second end of said pivoting ferrule.

23. The actuator assembly of claim 19 further comprising a means for substantially limiting movement of at least one of said pivoting ferrule and said actuator element to pivoting about the axis created by said cable as said cable exits the second end of said pivoting ferrule.

24. The actuator assembly of claim 19 wherein said reaction element has a fixed position and said actuator element has relative movement with said reaction element.

25. The actuator assembly of claim 19 further comprising a second pivoting ferrule disposed on the opposite end of said conduit from said first pivoting ferrule and pivotally securing that opposite end of said conduit to said reaction element.

26. The actuator assembly of claim 19 further comprising a pivot limiting structure.

27. The actuator assembly of claim 19 further comprising a means for limiting the pivoting movement of said at least one pivoting ferrule and actuator element to pivoting in a portion of an arc about the axis created by said cable as said cable exits the second end of said pivoting ferrule.

28. The actuator assembly of claim 20 wherein the angle in said pivoting ferrule is approximately ninety degrees.

29. The actuator assembly of claim 20 wherein said pivoting ferrule contains a pulley between its first and second ends over which said cable passes as it traverses the angle in said pivoting ferrule.

30. The actuator assembly of claim 29 wherein said pulley is integral with said pivoting ferrule.

31. The actuator assembly of claim 22 wherein said first retention fixture is a tab oriented substantially perpendicular to the pivot axis of the pivoting ferrule and said second retention fixture is a slot adapted to receive said tab.

32. The actuator assembly of claim 22 wherein said first retention fixture is at least one protuberance and said second retention fixture is at least one concavity adapted to receive said protuberance.

33. The actuator assembly of claim 25 wherein said first and second pivoting ferrules are configured to pivot in different planes.

34. The actuator assembly of claim 24 wherein the first end of said cable is in operative connection with said actuator element and said second end of said cable is in operative connection with said reaction element.

35. The actuator assembly of claim 34 wherein said reaction element is a steering wheel tilt lock.

36. The actuator assembly of claim 35 wherein said actuator element is a tilt-lock release mechanism.

37. A cable operated actuator assembly comprising:
   an actuator element;
   a reaction element;
   a conduit having first and second ends, a first predetermined length, and defining a lumen therethrough;
   a cable having first and second ends and a second predetermined length longer than the first predetermined length and being slideably disposed through said lumen of said conduit;
   a pivoting ferrule having first and second ends and defining a bore therethrough; and
   means for limiting the movement of at least one of said pivoting ferrule and said reaction element;
      wherein one of said first and second ends of said conduit is secured to said actuator element;
      wherein the other of said first and second ends of said conduit is secured to the first end of said pivoting ferrule;
      wherein said reaction element is pivotally secured to the second end of said pivoting ferrule;
      wherein said cable is slideably disposed within said bore and the second end of said cable extends out of the second end of said pivoting ferrule;
      where at least one of said pivoting ferrule and said reaction element may pivot substantially about the axis created by said cable as it exits the second end of said pivoting ferrule.

38. The cable operated actuator assembly of claim 37 wherein said limiting means is a pivot limiting structure.

39. A cable operated actuator assembly comprising:
   an actuator element;
   a reaction element;
   a conduit having first and second ends, a first predetermined length, and defining a lumen therethrough;
   a cable having first and second ends and a second predetermined length longer than the first predetermined length and being slideably disposed through said lumen of said conduit;
   a pivoting ferrule having first and second ends and defining a bore therethrough; and
   means for limiting the movement of at least one of said pivoting ferrule and said actuator element;
      wherein one of said first and second ends of said conduit is secured to said reaction element;
      wherein the other of said first and second ends of said conduit is secured to the first end of said pivoting ferrule;
      wherein said actuator element is pivotally secured to the second end of said pivoting ferrule;
      wherein said cable is slideably disposed within said bore and the second end of said cable extends out of the second end of said pivoting ferrule;
      where at least one of said pivoting ferrule and said actuator element may pivot substantially about the axis created by said cable as it exits the second end of said pivoting ferrule.

40. The cable operated actuator assembly of claim 39 wherein said limiting means is a pivot limiting structure.

41. A cable operated actuator assembly comprising:
   an actuator element;
   a reaction element;
   a conduit having first and second ends, a first predetermined length, and defining a lumen therethrough;
   a cable having first and second ends and a second predetermined length longer than the first predetermined length and being slideably disposed through said lumen of said conduit;
   a first pivoting ferrule having first and second ends and defining a first bore therethrough;
   a second pivoting ferrule having first and second ends and defining a second bore therethrough;
      wherein one of said first and second ends of said conduit is secured to the first end of said first pivoting ferrule;
      wherein the other of said first and second ends of said conduit is secured to the first end of said second pivoting ferrule;
      wherein the second end of said first pivoting ferrule is pivotally secured to said actuator element;
      wherein the second end of said second pivoting ferrules is pivotally secured to said reaction element;
      wherein said cable is slideably disposed within said first and second bores such that the first and second ends of said cable extend out of the second ends of said first and second ferrules;
      wherein at least one of said first pivoting ferrule and said actuator element may pivot substantially about the axis created by said cable as it exits the second end of said first pivoting ferrule; and
      wherein at least one of said second pivoting ferrule and said reaction element may pivot substantially about the axis created by said cable as it exits the second end of said second pivoting ferrule.

* * * * *